(12) United States Patent
Kouzu et al.

(10) Patent No.: US 8,841,802 B2
(45) Date of Patent: Sep. 23, 2014

(54) MOTOR ACTUATOR HAVING ELECTRIC MOTOR RECEIVED IN HOUSING

(75) Inventors: Takahiro Kouzu, Kariya (JP); Satoshi Ishigaki, Takahama (JP); Tadashi Komiyama, Chiryu (JP)

(73) Assignee: Denso Corporation, Kariya (JP)

( * ) Notice: Subject to any disclaimer, the term of this patent is extended or adjusted under 35 U.S.C. 154(b) by 1267 days.

(21) Appl. No.: 11/593,004

(22) Filed: Nov. 6, 2006

(65) Prior Publication Data

US 2007/0103010 A1    May 10, 2007

(30) Foreign Application Priority Data

Nov. 4, 2005   (JP) .................................. 2005-320674

(51) Int. Cl.
*H02K 5/24* (2006.01)
(52) U.S. Cl.
USPC .................................. 310/51; 310/89; 310/91
(58) Field of Classification Search
CPC ....................................................... H02K 5/24
USPC ........... 310/51, 86, 89, 91, 216.124, 216.131, 310/426, 427, 431; 336/100; 74/573
IPC ................................................ H02K 5/24, 5/00
See application file for complete search history.

(56) References Cited

U.S. PATENT DOCUMENTS

| | | | | |
|---|---|---|---|---|
| 3,426,227 | A * | 2/1969 | Miller et al. | 310/180 |
| 5,979,405 | A * | 11/1999 | Sato et al. | 123/399 |
| 6,320,287 | B1 * | 11/2001 | Watson et al. | 310/51 |
| 6,952,061 | B2 * | 10/2005 | Mogi et al. | 310/90 |
| 2003/0094862 | A1 * | 5/2003 | Torrance et al. | 310/51 |
| 2003/0201681 | A1 * | 10/2003 | Shimizu et al. | 310/51 |
| 2006/0042594 | A1 * | 3/2006 | Wayama et al. | 123/399 |

FOREIGN PATENT DOCUMENTS

| | | | |
|---|---|---|---|
| EP | 1 544 438 A2 | 6/2005 | |
| JP | U-51-101280 | 8/1976 | |
| JP | 2001-054254 | 2/2001 | |
| JP | 2004-153914 | 5/2004 | |
| JP | 2004153914 A * | 5/2004 | ............... H02K 5/24 |

OTHER PUBLICATIONS

Machine translation of Torii et al. (JP2004-153914).*
Office Action (pp. 1-2) dated Aug. 5, 2010 issued in corresponding Japanese Application No. 2005-320674 with an at least partial English-language version thereof.
Office Action (2 pgs.) dated Dec. 21, 2010 issued in corresponding Japanese Application No. 2005-320674 with an at least partial English-language translation thereof (2 pgs.).

* cited by examiner

*Primary Examiner* — Michael Andrews
(74) *Attorney, Agent, or Firm* — Nixon & Vanderhye PC (57) ABSTRACT

An axial groove is provided in an inner peripheral wall surface of a motor case of a housing of a motor actuator, and a spring installation opening is provided to the axial groove at a location adjacent to an opening end of a motor receiving hole of the motor case, which receives a motor. A damper spring is inserted into the groove through the spring installation opening. The damper spring urges the motor against first and second ridges formed in the inner peripheral wall surface of the motor case.

17 Claims, 6 Drawing Sheets

FIG. 6
PRIOR ART

MOTOR ACTUATOR HAVING ELECTRIC MOTOR RECEIVED IN HOUSING

CROSS REFERENCE TO RELATED APPLICATION

This application is based on and incorporates herein by reference Japanese Patent Application No. 2005-320674 filed on Nov. 4, 2005.

BACKGROUND OF THE INVENTION

1. Field of the Invention

The present invention relates to a motor actuator.

2. Description of Related Art

A previously proposed motor actuator includes an electric motor and a speed reducing gear mechanism. The motor generates a drive force (motor torque) upon receiving electric power, and the speed reducing gear mechanism uses the motor torque of the motor to drive a fluid control valve. This motor actuator further includes a housing, in which a motor receiving hole is formed. The motor is installed into the motor receiving hole through a motor installation opening of the motor receiving hole and is securely supported by the housing. Here, at the time of installing the motor into the interior of the housing, a rear end part and a front end part of the motor are inserted in this order into the interior of the motor receiving hole through the motor installation opening. Thereafter, a motor fitting hole of a metal plate is fitted around a small diameter protrusion (a front bearing holder) provided at the front end side of the motor, and then the metal plate is fixed to the housing through use of fixing elements. Thus, when the engine vibration is transmitted to the motor through the metal plate, the motor is disadvantageously vibrated in the radial direction in the housing.

Figure 5A:
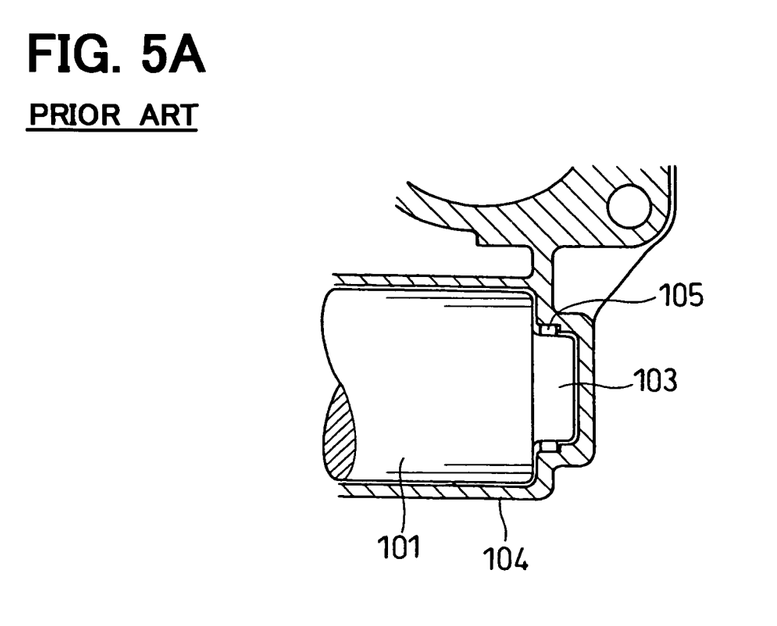
FIGS. 5A and 5B are cross sectional views showing a schematic structure of a motor actuator according to a previously proposed technique.
Figure 5B:
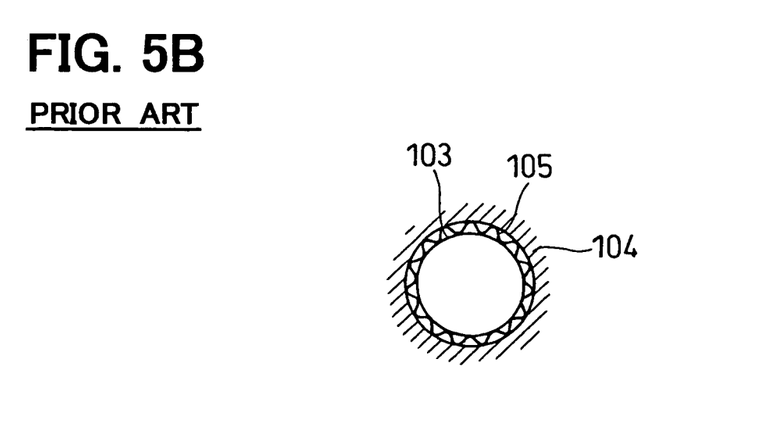

With reference to FIGS. 5A and 5B, in order to reduce the vibration in the radial direction of the motor, which is securely supported in the housing, it has been proposed to provide a plate type resilient member 105, which resiliently supports the motor 101 in the radial direction (the radial direction of the motor 101) that is perpendicular to the axial direction of the motor 101, in a gap between an outer peripheral surface of a small diameter protrusion (a bearing holder) 103 provided at a rear end side of the motor 101 (see, for example, Japanese Unexamined Patent Publication No. H10-252510 corresponding to U.S. Pat. No. 5,979,405 and Japanese Unexamined Patent Publication No. 2004-153914).

However, in the above motor actuator, when the plate type resilient member 105 is placed in the gap between the inner peripheral wall surface of the housing 104 and the outer peripheral surface of the small diameter protrusion 103 provided at the rear end side of the motor 101, the plate type resilient member 105 is hidden by the motor 101 and the housing 104. Thus, the assembling operation needs to be carried out in the state where the plate type resilient member 105 cannot be seen through the motor installation opening, which is the opening of the housing 104. As a result, after the installation of the motor 101 into the interior of the housing 104, it is difficult to determine whether the plate type resilient member 105 is properly installed to a predetermined installation position of the motor 101 or of the housing 104, thereby resulting in the reduced reliability of the installation operation of the plate type resilient member 105.

In view of the above disadvantage, there has been proposed another motor actuator, in which the plate type resilient member 105 is preinstalled to the motor 101 before the installation of the plate type resilient member 105 into the housing 104, and visual check of an installation state of the motor 101 and the plate type resilient member 105 is enabled to allow check of an abnormality after the installaton of the motor 101 and the plate type resilient member 105 into the interior of the housing 104 (see, for example, Japanese Unexamined Patent Publication No. 2005-180342 corresponding to EP 1544438A2).

Figure 6:
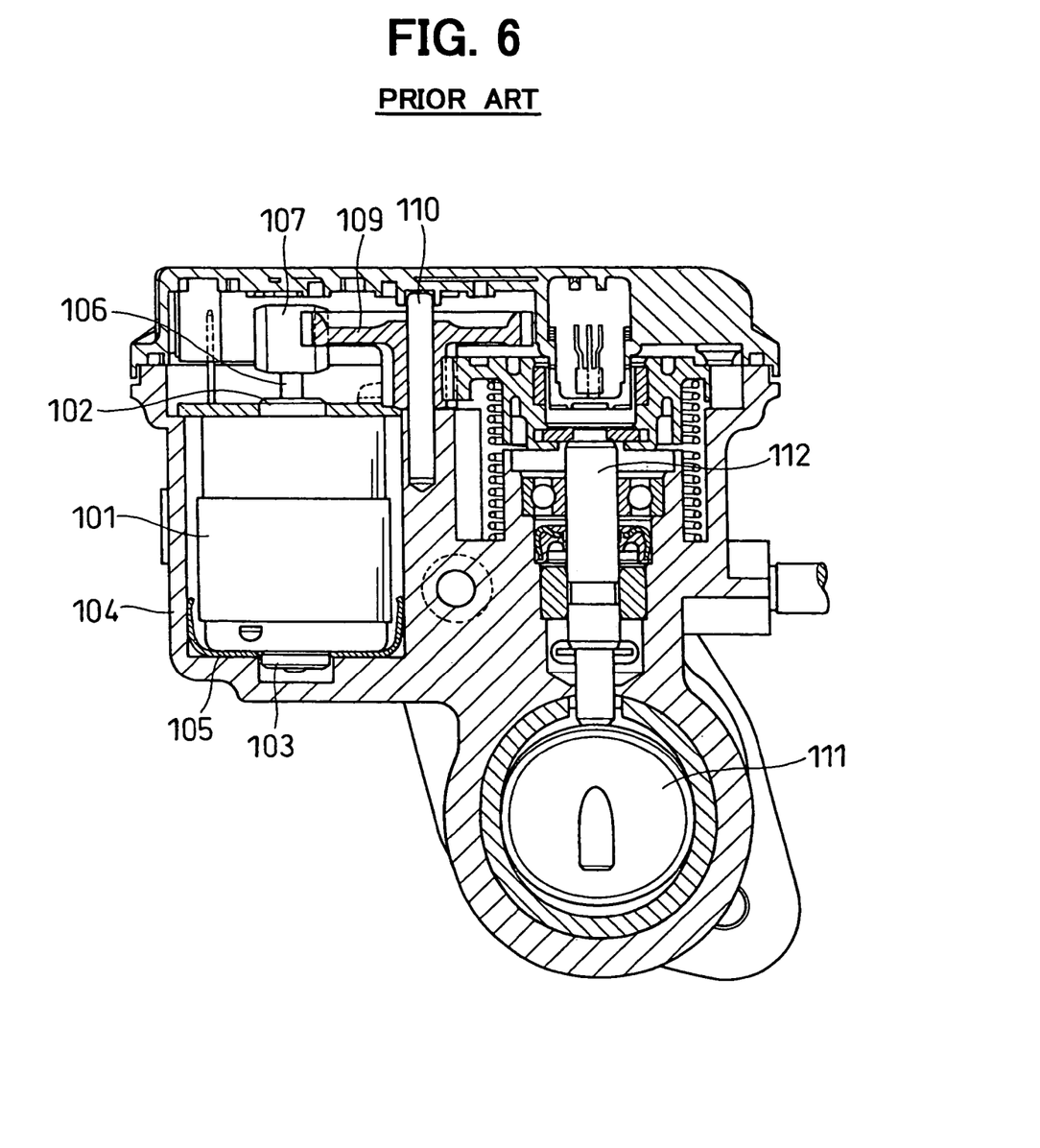
FIG. 6 is a cross sectional view showing an entire structure of a motor actuator according to another previously proposed technique.

However, similar to the motor actuator shown in FIGS. 5A and 5B, in this motor actuator, the plate type resilient member 105 is placed to circumferentially surround the small diameter protrusion 103 provided at the rear end side of the motor 101, as shown in FIG. 6. Thus, when the motor shaft 106 is vibrated in the radial direction of the motor 101 due to the vibration of the motor 101, the stress is applied to each of the front and rear bearing members (bearings), which are spaced from each other in the axial direction of the motor 101. In this way, the stress is concentrated in the root of each of the small diameter protrusions 102, 103 of the motor 101, so that the small diameter protrusions 102, 103 provided at the front and rear end sides of the motor 101 may possibly be damaged, thereby resulting in a reduction in the durability and reliability of the motor 101.

Furthermore, in the motor actuator, size variations in the outer diameter of the motor 101 generally exist due to the component tolerance and the product tolerance of the motor 101. In this case, due to the size variations in the outer diameter of the motor 101, a positional deviation may possibly be generated between a centering position at the front end side of the motor 101 and a centering position at the rear end side of the motor 101. This may result in tilting of the central axis of the motor shaft 106 of the motor 101 relative to the normal center axis or may result in a change in a shaft-to-shaft distance between the motor shaft 106 of the motor 101 and a gear shaft 110 of a speed reducing gear 109, which is meshed with a motor gear 107 that is fixed to the motor shaft 106. In this way, improper engagement may occur between the motor gear 107 and the speed reducing gear 109, so that the motor torque of the motor 101 cannot be efficiently transmitted to a valve shaft 112 of a valve element (valve) 111 of a fluid control valve. Therefore, performance of the motor actuator, particularly the drive force transmission function of the motor actuator is disadvantageously deteriorated.

SUMMARY OF THE INVENTION

Therefore, it is an objective of the present invention to alleviate or address at least one of the above disadvantages.

To achieve the objective of the present invention, there is provided a motor actuator, which includes an electric motor and a tubular housing. The motor includes a large diameter portion, which extends circumferentially around a motor shaft. The tubular housing has a closed bottom at one end and extends circumferentially around the large diameter portion of the motor. The housing includes a fitting blind hole and a groove. The large diameter portion of the motor is loosely fitted into the fitting blind hole. The groove is radially outwardly recessed from an inner peripheral wall surface of the fitting blind hole. A resilient motor support element is positioned in a gap between the large diameter portion of the motor and the groove of the housing to resiliently radially support the large diameter portion of the motor. The groove of the housing includes an opening, which is formed at a location adjacent to an opening end of the fitting blind hole, and through which the resilient motor support element is installed into the gap between the large diameter portion of the motor and the groove of the housing.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
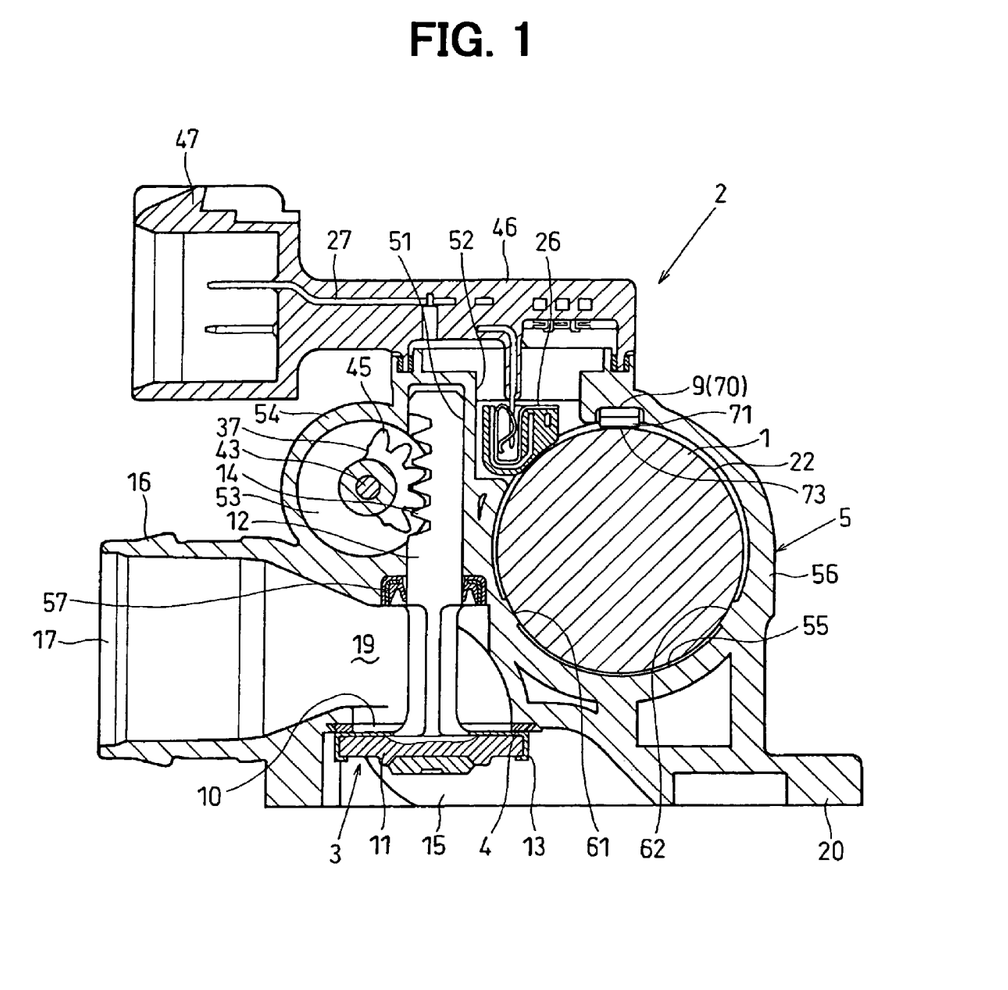
FIG. 1 is a cross sectional view showing a main structure of a secondary air control valve according to a first embodiment of the present invention.
Figure 2:
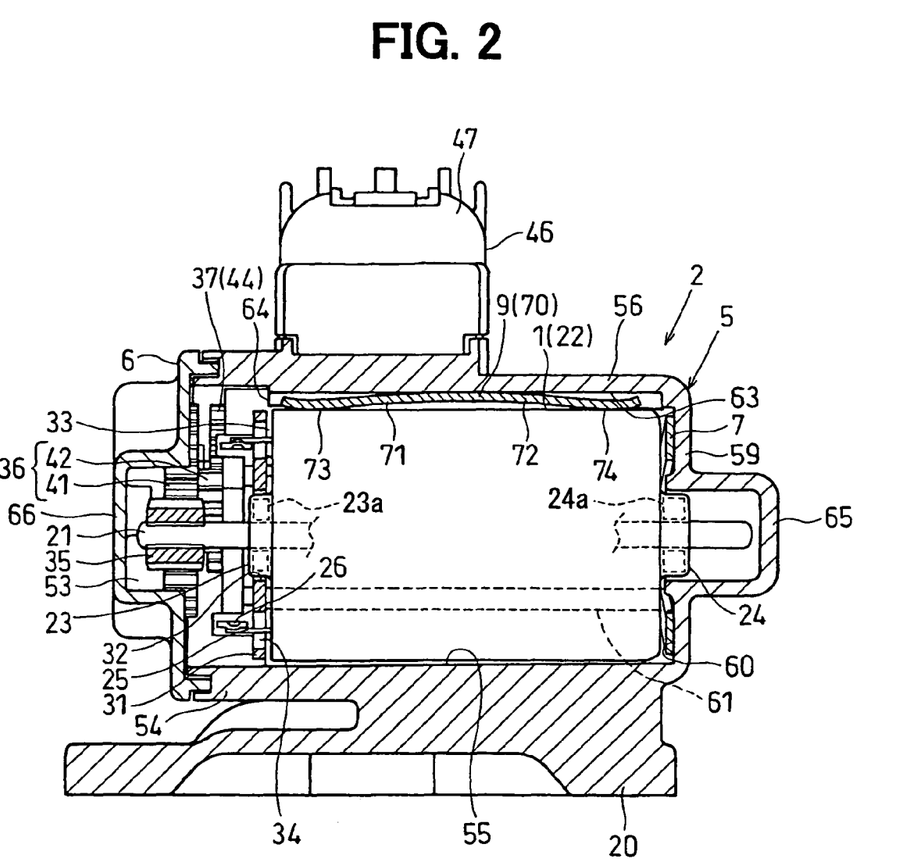
FIG. 2 is a cross sectional view showing an entire structure of a motor actuator according to the first embodiment.
Figure 3:
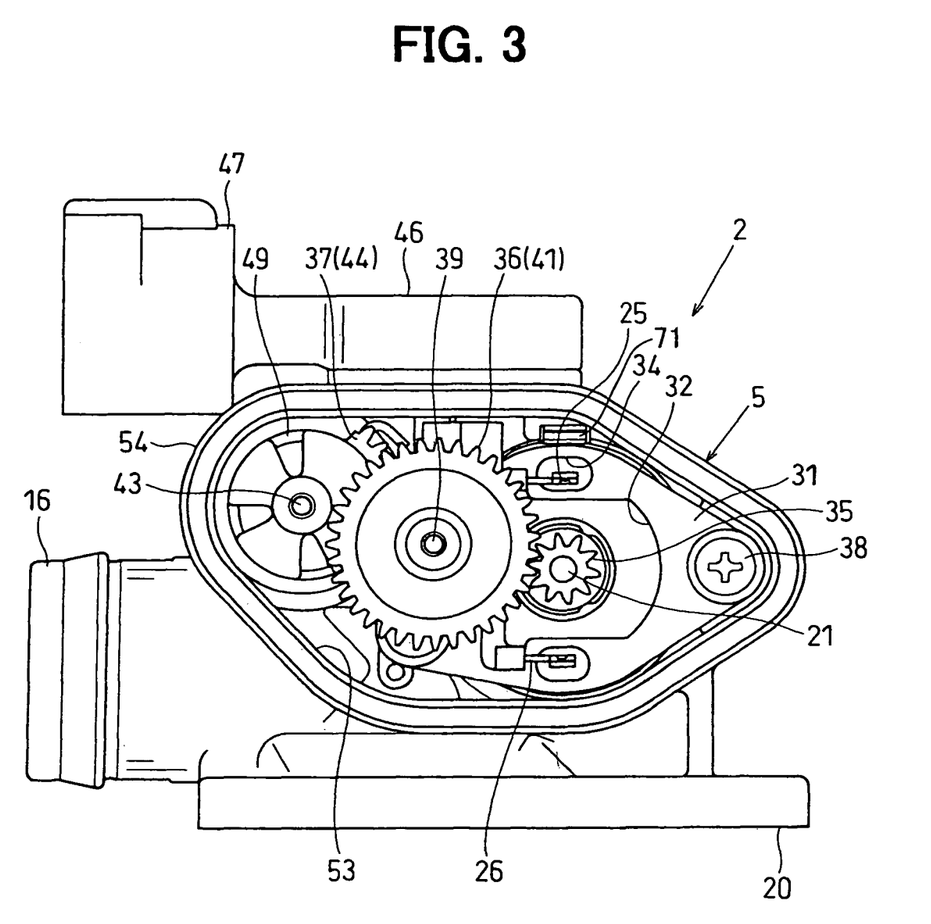
FIG. 3 is a plan view showing the entire structure of the motor actuator according to the first embodiment.

FIGS. 1 to 3 show a first embodiment of the present invention. Specifically, FIG. 1 shows a main structure of a secondary air control valve, and FIGS. 2 and 3 show an entire structure of a motor actuator.

The secondary air control valve of the present embodiment is installed in a secondary air supply system (a secondary air supply apparatus) that promotes warming-up of a three-way catalyst of a three-way catalytic converter (not shown) by guiding secondary air, which is generated in a secondary air pipe (a fluid pipe), to the three-way catalytic converter at the time of starting an internal combustion engine, such as a gasoline engine, (hereinafter, referred to as an engine). The secondary air supply system is installed in, for example, an engine room of a vehicle, such as an automobile. Furthermore, an electric air pump (not shown) is connected to the secondary air control valve through the secondary air pipe, and the secondary air control valve is connected to an engine exhaust pipe through the secondary air pipe. The secondary air supply system of the present embodiment includes an engine control unit (ECU), which electronically controls the electric air pump and an electric motor 1 based on an operational state of the engine. Here, the motor 1 is a drive source of the secondary air control valve.

The secondary air control valve is an electric flow control valve (a combination valve module), in which an air switching valve (hereinafter, referred to as an ASV) 2 and a check valve (not shown) are integrated. The ASV 2 opens and closes a secondary air passage (a fluid passage) formed in a housing and serves as a flow passage opening/closing valve or an air passage opening/closing valve. The check valve limits backflow of fluid, such as exhaust gas, from a merging portion, at which the secondary air pipe and the engine exhaust pipe merge together, to the ASV side. The check valve includes a thin film like reed valve, which is opened by the pressure of the secondary air, which is outputted from the electric air pump. The ASV 2 includes a poppet valve (a valve element of the secondary air control valve) 3 and a valve seat 4. The poppet valve 3 reciprocates linearly in an axial direction and is seatable against the valve seat 4. The poppet valve 3 is installed into a housing 5 together with the motor 1.

The ECU includes a microcomputer of a known type, which has a CPU for performing a control operation and computing operations and a storage device (e.g., a memory (s), such as a ROM, a RAM) for storing various programs and data. The ECU is a motor control unit, which controls rotation of the motor 1 by adjusting the electric power supplied to the motor 1 according to a control program stored in the memory when an ignition switch is turned on (IG ON). At the time of starting the engine, the ECU senses the exhaust gas temperature through an exhaust temperature sensor (not shown). When the exhaust gas temperature, which is measured with the exhaust temperature sensor, is equal to or less than a predetermined temperature, the ECU supplies the electric power to the motor 1 to drive the ASV 2 and thereby to open the same. At this time, the electric power is supplied to the electric air pump, so that the secondary air is generated in the secondary air passage, which is formed in the secondary air pipe.

The poppet valve 3 of the ASV 2 is formed integrally by a resin material and is movably received in the housing 5. The poppet valve 3 forms the valve element (the valve element of the secondary air control valve), which is lifted away from and is seated against the valve seat 4 to open and close a valve port (the valve port of the ASV 2) 10. The poppet valve 3 includes an annular flange type valve head (a valve) 11 and a cylindrical valve shaft 12 and is reciprocated in the axial direction of the poppet valve 3. Alternatively, it is possible to use another type of poppet valve 3, which is formed by separately manufacturing the valve head 11 and the valve shaft 12 and thereafter joining the valve head 11 and the valve shaft 12 together.

In the present embodiment, a back surface (a valve face) of the valve head 11 of the poppet valve 3 is seated against a lower end surface of the valve seat 4 (a circumferential edge part of the opening of the valve port 10) in FIG. 1. The valve head 11 is provided to one axial end part (a lower end part in FIG. 1) of the valve shaft 12 in such a manner that the valve head 11 is formed as the annular flange, which has an outer diameter that is larger than an outer diameter of the valve shaft 12. A resilient rubber element (seal rubber) 13 is installed to an outer peripheral part of the valve head 11 by, for example, vulcanizing or heating the resilient rubber element 13 to the valve head 11 to increase a degree of sealing (airtightness) between the valve head 11 and the valve seat 4.

The one axial end (the lower end in FIG. 1) of the valve shaft 12 of the poppet valve 3 is hollow. Furthermore, a toothed rack portion (a rack) 14 is formed in the other axial end part (the upper end part in FIG. 1) of the valve shaft 12 of the poppet valve 3 to have a plurality of teeth, which are arranged one after another in the axial direction of the valve shaft 12. The toothed rack portion 14 constitutes a part of a moving direction converting mechanism. The poppet valve 3 is constructed such that when the valve head 11 is lifted from the valve seat 4, i.e., when the poppet valve 3 is opened, the valve head 11 is held (positioned) in a middle of a space (a communication passage 15), which is formed between the check valve and the valve seat 4. That is, the poppet valve 3 is constructed to move toward the one axial side (the check valve side) of the poppet valve 3 when the poppet valve 3 is opened.

In the valve seat 4, the valve port 10 is formed as a circular opening, through which the secondary air passes. The valve seat 4 is formed separately from the housing 5 and is then joined integrally to the corresponding interior part of the housing 5. Alternatively, the valve seat 4 may be formed integrally in the housing 5. In the present embodiment, the secondary air is taken into an inlet opening (hereinafter, referred to as an inlet port) 17 of an inlet pipe 16, which is formed integrally with the housing 5. Then, the secondary air flows into the valve port 10 through the interior (a fluid intake passage 19) of the housing 5. The communication passage 15 is formed at an outlet opening of the housing 5. The communication passage 15 communicates between the valve por 10 of the ASV 2 and a fluid pass-through opening (not shown) that is opened and closed by the reed valve of the check valve. A connecting portion 20, which is connected to a housing of the check valve, is formed in a peripheral edge part of the outlet opening of the housing 5.

As shown in FIGS. 1 to 3, the valve drive apparatus (the motor actuator), which drives the poppet valve 3 of the ASV 2 to open (or close) the same, is powered by the electric power and includes the motor 1, a drive force transmission mechanism, the housing 5, a gear cover 6 and a resilient motor support element (hereinafter, referred to as a damper spring) 9. The motor 1 generates drive force to drive the poppet valve 3 when the electric power is supplied to the motor 1. The drive force transmission mechanism includes the moving direction converting mechanism and transmits the drive force of the motor 1 to the valve shaft 12 of the poppet valve 3. The housing 5 has a motor receiving hole therein. The gear cover 6 receives the drive force transmission mechanism between the housing 5 and the gear cover 6. The damper spring 9 is arranged between the motor 1 and the housing 5.

The motor 1 is placed in the housing 5 in such a manner that a predetermined annular gap is formed between the motor 1 and the inner peripheral wall surface of the housing 5. Furthermore, the motor 1 includes a cylindrical portion (a large diameter portion, such as a cylindrical motor frame or a cylindrical yoke) 22, which circumferentially surrounds a motor shaft 21 of the motor 1. Furthermore, the motor 1 includes first and second small diameter protrusions (small diameter portions) 23, 24, which are arranged at axial ends, respectively, of the cylindrical portion 22. The motor 1 has its largest diameter portion between the first small diameter protrusion 23 and the second small diameter protrusion 24. The outer diameter of the cylindrical portion 22 of the motor 1 is larger than the outer diameter of the first small diameter protrusion 23 and the outer diameter of the second small diameter protrusion 24, and the cylindrical portion 22 itself forms the largest diameter portion in the motor 1. Hereinafter, the cylindrical portion 22 will be referred to as the largest diameter portion 22. The largest diameter portion 22 of the present embodiment includes a front end part (a first end part) and a rear end part (a second end part) at the axial end sides (one end side and the other end side), respectively, of the motor 1.

The motor 1 includes first and second bearing holding parts, each of which is shaped into a cylindrical form, at the axial end sides of the largest diameter portion 22 to hold first and second bearing members 23a, 24a therein. The outer diameters of the first and second small diameter protrusions 23, 24 are smaller than the outer diameter of the largest diameter portion 22 of the motor 1, and the first and second small diameter protrusions 23, 24 form the first and second bearing holding parts, respectively. The first small diameter protrusion 23 at the front end side of the motor 1 is formed to protrude on the one axial side of the motor 1 from the front end surface of the largest diameter portion 22 of the motor 1. The second small diameter protrusion 24 at the rear end side of the motor 1 is formed to protrude on the other axial side of the motor 1 from the rear end surface of the largest diameter portion 22 of the motor 1. Ball bearings or cylindrical bearings, which rotatably support the axial end sides (the one end part and the other end part) of the motor shaft 21, are used as the first and second bearing members 23a, 24a, respectively.

The motor 1 of the present embodiment is a brushless direct current (DC) motor, which includes a rotor and a stator. The rotor is integrated to the motor shaft 21, and the stator is arranged at the radially outward of the rotor to radially oppose the rotor. Furthermore, the rotor includes a rotor core 29 (see FIG. 4A), which includes a permanent magnet. The stator includes a cylindrical yoke and a stator core 28 (see FIG. 4A), around which armature coils (armature windings) are wound. Two motor power supply contacts 25 protrude axially outwardly from the front end surface of the largest diameter portion 22 of the motor 1 and are electrically connected to coil ends of the armature coils of the motor 1 through terminals 26, 27. When the ECU supplies the electric power to the motor 1, the motor shaft 21 rotates in a normal direction (a valve opening direction) or a reverse direction (a valve closing direction).

The first small diameter protrusion 23 of the motor 1 of the present embodiment is loose-fitted to a motor fitting hole 32 of a metal plate 31 in such a manner a gap is left between the first small diameter protrusion 23 and the inner peripheral wall surface of the motor fitting hole 32 of the metal plate 31. The metal plate 31 is spaced from and is axially opposed to the front end surface of the largest diameter portion 22 of the motor 1 in such a manner that a gap is axially provided between the metal plate 31 and the front end surface of the largest diameter portion 22 of the motor 1. Furthermore, the metal plate 31 is fixed to a circumferential edge part of a motor installation opening 33 of the housing 5 with screws 38. The metal plate 31 has contact insertion holes 34, through which the two motor power supply contacts 25 are inserted, at a position adjacent to the motor fitting hole 32. In the present embodiment, the brushless DC motor is used as the motor 1. However, in place of the brushless DC motor, a brush direct current (DC) motor or alternating current (AC) motor, such as a three-phase induction motor, may be used as the motor 1.

The drive force transmission mechanism includes a speed reducing gear mechanism, which transmits the drive force of the motor 1 (a motor output shaft torque, which will be referred to as a motor torque) to the valve shaft 12 of the poppet valve 3 and reduces the rotational speed (motor speed) of the motor shaft 21 of the motor 1 at a predetermined speed reducing ratio. The speed reducing gear mechanism includes a cylindrical pinion gear (a motor-side gear, a first gear) 35, an intermediate speed reducing gear (an intermediate gear, a second gear) 36, a final gear (a valve-side gear, a third gear) 37 and the toothed rack portion 14. The pinion gear 35 is fixed to an outer peripheral surface of the motor shaft 21 of the motor 1. The intermediate speed reducing gear 36 is meshed with the pinion gear 35 to receive motor torque from the pinion gear 35. The final gear 37 is meshed with the intermediate speed reducing gear 36 to receive the motor torque from the intermediate speed reducing gear 36. The toothed rack portion 14 is provided to the valve shaft 12 of the poppet valve 12.

The pinion gear 35 is arranged generally coaxially with the motor shaft 21. The pinion gear 35 includes a cylindrical portion, which is fixed to the outer peripheral surface of the motor shaft 21 of the motor 1 by press fitting and thereby is rotated integrally with the motor shaft 2.1. A plurality of gear teeth is arranged one after another in a circumferential direction in an outer peripheral surface of the cylindrical portion of the pinion gear 35. The motor shaft 21 of the motor 1 forms a gear shaft (a motor shaft) of the first gear, which forms a rotational center of the pinion gear 35.

The intermediate speed reducing gear 36 includes an intermediate speed reducing gear shaft 39, which is generally in parallel with the motor shaft 21 of the motor 1 and is generally perpendicular to the central axis of the valve shaft 12 of the poppet valve 3. The intermediate speed reducing gear shaft 39 forms a gear shaft of the second gear, which forms a rotational center of the intermediate speed reducing gear 36. The damper spring 9 is arranged on one side (the upper side in FIG. 3) of the motor shaft 21 and the intermediate speed reducing gear shaft 39 in a direction that is generally perpendicular to an axial direction of the motor shaft 21 and an axial direction of the intermediate speed reducing gear shaft 39. Thus, referring to FIG. 3, it can be seen that damper spring 9 (resilient supporting piece 71) is disposed along an imaginary line which is generally perpendicular to a line that passes through both the axis of main shaft 21 and the axis of the gear shaft 39. One axial end of the intermediate speed reducing gear shaft 39 is securely press fitted into a fitting recess (not shown), which is formed in the gear cover 6. The other axial end of the intermediate speed reducing gear shaft 39 is securely press fitted into a fitting recess (not shown), which is formed in the housing 5. The intermediate speed reducing gear 36 includes a cylindrical portion, which is rotatably fitted around an outer peripheral surface of the intermediate speed reducing gear shaft 39 and rotates about the central axis of the intermediate speed reducing gear shaft 39. A large diameter gear 41 is formed in one axial end of the cylindrical portion of the intermediate speed reducing gear 36 to mesh with the pinion gear 35. A small diameter gear 42 is formed in the other axial end of the cylindrical portion of the intermediate speed reducing gear 36 to mesh with the final gear 37.

The final gear 37 includes a pinion gear shaft 43. An axis of the pinion gear shaft 43 is generally in parallel with the motor shaft 21 of the motor 1 and also generally in parallel with the intermediate speed reducing gear shaft 39 of the intermediate speed reducing gear 36. Furthermore, the axis of the pinion gear shaft 43 is generally perpendicular to the central axis of the valve shaft 12 of the poppet valve 3. The pinion gear shaft 43 forms a gear shaft, which serves as a rotational center of the final gear 37. One axial end of the pinion gear shaft 43 is securely press fitted into a fitting recess (not shown), which is formed in the gear cover 6. The other axial end of the pinion gear shaft 43 is securely press fitted into a fitting recess (not shown), which is formed in the housing 5. The final gear 37 includes a cylindrical portion, which is rotatably fitted around an outer peripheral surface of the pinion gear shaft 43 and rotates about the central axis of the pinion gear shaft 43. A gear portion 44 is formed in one axial end of the cylindrical portion of the final gear 37 to mesh with the small diameter gear 42 of the intermediate speed reducing gear 36. Furthermore, a pinion gear 45, which serves as a constituent component of the moving direction converting mechanism, is formed in the other axial end of the cylindrical portion of the final gear 37.

The moving direction converting mechanism includes the pinion gear 45 of the final gear 37 and the toothed rack portion (the rack) 14. The toothed rack portion 14 is meshed with the pinion gear 45. Thereby, the moving direction converting mechanism forms a rack and pinion arrangement, which converts the rotational movement of the final gear 37 into the axial reciprocal movement of the poppet valve 3. Furthermore, the teeth of toothed rack portion 14 are provided to the opposite axial end part of the valve shaft 12 of the poppet valve 3, which is opposite from the poppet valve 3 side, on a pinion gear 45 side lateral face of the opposite axial end part of the valve shaft 12. The toothed rack portion 14 is constructed to have projections (the teeth) and recesses, which are alternately arranged in the axial direction of the valve shaft 12. In the present embodiment, the toothed rack portion 14 is formed integrally with the valve shaft 12 of the poppet valve 3. Alternatively, the toothed rack portion 14 may be formed integrally in a rack bar and then may be joined to the valve shaft 12 of the poppet valve 3 to move integrally. Furthermore, in the present embodiment, a coil spring 49 is provided at the radially outward of the final gear 37, i.e., is provided to an outer peripheral surface of an intermediate part of the cylindrical portion, which is between the gear portion 44 and the pinion gear 45, to spirally surround the pinion gear shaft 43. The coil spring 49 is a return spring, which urges the final gear 37 to return a rotational position of the final gear 37 to its initial position (a default position). Particularly, the coil spring 49 is made of a torsion spring, which generates a torsional resilient force, which drives the final gear 37 to rotate the same in a direction opposite from the valve opening direction.

The housing 5 is made of a resin material or a metal material and is shaped into a predetermined form. A resin molded member 46 is assembled to the upper end of the housing 5 in FIG. 1. The resin molded member 46 is made of a resin material (a dielectric resin material) and includes a male connector, which is formed integrally with the resin molded member 46 and is mechanically connected to a female connector that is provided to a distal end of a vehicle side (ECU side) wire harness. When the female connector at the distal end of the vehicle side wire harness is inserted into a connector shell 47 of the male connector, an electrical connection is established between a motor drive circuit of the ECU and the terminals 27 of the motor 1. The vehicle side wire harness includes a plurality of bundled conductive lines covered with a dielectric protective sheath. The conductive lines are electrically connected to corresponding female terminals of the female connector.

The housing 5 of the present embodiment includes a cylindrical valve guide 52, a tubular gear box 54 and a motor case (a cylindrical portion of the housing 5) 56, which are formed integrally. The cylindrical valve guide 52 has an axial hole 51 formed therein. The tubular gear box 54 forms a gear receiving chamber 53 between the tubular gear box 54 and the gear cover 6. The motor case 56 has a motor receiving hole 55 formed therein. The valve guide 52 of the housing 5 slidably supports the valve shaft 12 of the poppet valve 3 in the axial hole 51. An annular dust seal 57 is installed between the outer peripheral surface of the valve shaft 12 of the poppet valve 3 and an inner peripheral wall surface of the fluid intake passage 19 side (the opening end side) of the valve guide 52 of the housing 5 to limit leakage of the secondary air from the fluid intake passage 19. The gear box 54 of the housing 5 cooperates with the gear cover 6 and the motor case 56 to form an actuator case. The gear receiving chamber 53 of the gear box 54 rotatably receives the respective gears (the pinion gear 45, the intermediate speed reducing gear 36 and the final gear 37) of the speed reducing gear mechanism. The motor installation opening 33 of the motor case 56 opens in the bottom wall surface of the gear box 54.

In the motor case 56 of the housing 5 of the present embodiment, the motor receiving hole 55, which has a generally circular cross section, receives the motor 1. The motor case 56 includes a generally cylindrical peripheral wall, the motor installation opening 33 and an annular closing end 59. The cylindrical peripheral wall surrounds the largest diameter portion 22 of the motor 1. The motor installation opening 33 opens at one axial end of the cylindrical peripheral wall. The annular closing end 59 is provided at the other axial end of the cylindrical peripheral wall, i.e., at the bottom of the motor receiving hole 55 to close the same. The motor receiving hole 55 of the present embodiment is a fitting blind hole, into which the largest diameter portion 22 of the motor 1 is loosely fitted in such a manner that a gap is left between the outer peripheral surface of the largest diameter portion 22 and the inner peripheral wall surface of the motor receiving hole 55. In the present embodiment, a wave washer 7 is interposed between the rear end surface of the largest diameter portion 22 of the motor 1 and a bottom wall surface of the closing end 59 of the motor case 56 of the housing 5 to urge the largest diameter portion 22 in the axial direction toward the motor installation opening 33 side. The wave washer 7 is an annular resilient member, which is resiliently deformable in the axial direction (a thrust direction of the motor 1) that coincides with the direction of the central axis of the motor 1, and which is wavy in the circumferential direction thereof. An annular groove 60, which receives and holds the wave washer 7, is formed in the bottom wall surface of the closing end 59 of the motor case 56.

First and second ridges (projections) 61, 62 are formed in the cylindrical peripheral wall of the motor case 56 to project radially inward from the inner peripheral wall surface of the motor receiving hole 55. A single axial groove (a streak like groove) 63 is formed in the cylindrical peripheral wall of the motor case 56 to radially outwardly recess from the inner peripheral wall surface of the motor receiving hole 55. Each of the first and second ridges 61, 62 has a trapezoidal cross section. Furthermore, the first and second ridges 61, 62 are arranged on an opposite side of the motor case 56, which is diametrically opposite from the single axial groove 63 side of the motor case 56 about the central axis of the largest diameter portion 22. Furthermore, the first and second ridges 61, 62 are circumferentially spaced from each other at a predetermined interval (e.g., 100 degree interval) around the outer peripheral surface of the largest diameter portion 22 of the motor 1. The first and second ridges 61, 62 extend linearly in the axial direction of the largest diameter portion 22 of the motor 1 through the front end to the rear end of the largest diameter portion 22 to radially support and fix the entire largest diameter portion 22.

The single axial groove 63 is provided to the side of the motor case 56, which is diametrically opposite from the first and second ridge 61, 62 side of the motor case 56 about the central axis of the largest diameter portion 22 of the motor 1. A spring installation opening 64 is formed at one axial end of the axial groove 63 to receive the damper spring 9 into the interior of the motor case 56 after the installation of the motor 1 into the motor case 56. Specifically, the spring installation opening 64 is an opening, through which the damper spring 9 is inserted into the gap between the outer peripheral surface of the largest diameter portion 22 of the motor 1 and a groove bottom surface of the axial groove 63 of the motor case 56. Furthermore, at the location adjacent to the motor installation opening 33 of the motor case 56, which is on the upper side of the motor installation opening 33 in FIG. 2, the spring installation opening 64 and the motor installation opening 33 open from the motor case 56 toward the one axial side (a motor case outside) of the motor 1.

The axial groove 63 forms a rectangular space, which axially linearly extends in the axial direction of the largest diameter portion 22 of the motor 1 from the spring installation opening 64 to a point that is adjacent to the closing end 59 of the motor case 56. The axial groove 63 is provided at an apex of an imaginary isosceles triangle that is formed in the cross section of the motor case 56 (see FIG. 4A) such that a straight line, which connects between the first ridge 61 and the second ridge 62, forms a base side of the imaginary isosceles triangle, and two remaining equal sides of the imaginary isosceles triangle are joined at the apex where the axial groove 61 is located. Furthermore, an imaginary vertical line, which is perpendicular to the base side of the imaginary isosceles triangle and extends through the central axis of the largest diameter portion 22 of the motor 1, passes the axial groove 63. In addition, two concaves (or convexes) 65, 66, which are concaved (or convexed) toward the axial ends of the motor 1, are formed integrally in the housing 5 and the gear cover 6, respectively, to limit the interference with the motor shaft 21, the second small diameter protrusion 24 and the pinion gear 35.

The damper spring 9 is a plate type resilient member (a leaf spring), which is slightly bent into a generally W-shape and is formed through press working of a metal plate made of, for example, stainless steel or spring steel. The damper spring 9 extends in the axial direction of the largest diameter portion 22 of the motor 1 in the motor receiving hole 55 from the spring installation opening 64 of the axial groove 63 toward the annular closing end 59 of the motor case 56. The damper spring 9 has an intermediate portion 70, which is formed into a generally planar plate form and is received in the axial groove 63 of the cylindrical peripheral wall of the motor case 56. Alternatively, the intermediate portion 70 may be formed as a bent portion, which is bent generally into an inverted V-shape. The upper end of the intermediate portion 70 in FIG. 2 is resiliently engaged with a ceiling wall surface of the axial groove 63 (an upper side limiting portion for limiting the damper spring 9). Furthermore, the intermediate portion of the damper spring 9 is circumferentially positioned in the circumferential direction of the largest diameter portion 22 of the motor 1 by circumferential side walls of the axial groove 63 (a circumferential position limiting portion for limiting the circumferential position of the damper spring 9).

As shown in FIG. 2, the damper spring 9 includes a first resilient supporting piece 71, which is smoothly arcuately curved from the front end side (the left end side in FIG. 2) of the intermediate portion 70 toward the outer peripheral surface of the front end part of the largest diameter portion 22 of the motor 1 (toward a point at the spring installation opening 64 of the axial groove 63). The first resilient supporting piece 71 includes a first load applying part 73, which applies a sprig load to the front end part of the largest diameter portion 22 of the motor 1 to urge the front end part of the largest diameter portion 22 against the front end parts of the first and second ridges 61, 62. The first load applying part 73 is slightly recurved in an opposite direction, which is opposite from the bending direction of the intermediate portion 70. Alternatively, the first load applying part 73 may be formed as a bent portion, which is bent generally into an inverted V-shape.

The first load applying part 73 is placed at the position where the first load applying part 73 can resiliently engage with the front end part of the largest diameter portion 22 of the motor 1. The first load applying part 73 is positioned at the location that enables the first load applying part 73 and the front end parts of the first and second ridges 61, 62 of the motor case 56 to provide a three-point support to the front end part of the largest diameter portion 22 of the motor 1. The first load applying part 73 is provided at the apex of the imaginary isosceles triangle that is formed in the cross section of the motor case 56 (see FIG. 4A) such that the straight line, which connects between the front end part of the first ridge 61 and the front end part of the second ridge 62, forms the base side of the imaginary isosceles triangle, and the two remaining sides of the imaginary isosceles triangle are joined at the apex where the first load applying part 73 is located. Furthermore, the imaginary vertical line, which is perpendicular to the base side of the imaginary isosceles triangle and extends through the central axis of the largest diameter portion 22 of the motor 1, passes the first load applying part 73.

As shown in FIG. 2, the damper spring 9 further includes a second resilient supporting piece 72, which is smoothly arcuately curved from the rear end side (the right end side in FIG. 2) of the intermediate portion 70 toward the outer peripheral surface of the rear end part of the largest diameter portion 22 of the motor 1 (toward a point adjacent to the axial end of the motor receiving hole 55 and adjacent to the end of the axial groove 63, which are adjacent to the closing end 59 of the motor case 56). The second resilient supporting piece 72 includes a second load applying part 74, which applies a sprig load to the rear end part of the largest diameter portion 22 of the motor 1 to urge the rear end part of the largest diameter portion 22 against the rear end parts of the first and second ridges 61, 62. The second load applying part 74 is slightly recurved in the opposite direction (the same direction as the direction of the recurving of the first load applying part 73), which is opposite from the bending direction of the intermediate portion 70. Alternatively, the second load applying part 74 may be formed as a bent portion, which is bent generally into an inverted V-shape.

The second load applying part 74 is placed at the position where the second load applying part 74 can resiliently engage with the rear end part of the largest diameter portion 22 of the motor 1. The second load applying part 74 is positioned at the location that enables the second load applying part 74 and the rear end parts of the first and second ridges 61, 62 of the motor case 56 to provide the three-point support to the rear end part of the largest diameter portion 22 of the motor 1. The second load applying part 74 is provided at the apex of the imaginary isosceles triangle that is formed in the cross section of the motor case 56 (see FIG. 4A) such that the straight line, which connects between the rear end part of the first ridge 61 and the rear end part of the second ridge 62, forms the base side of the imaginary isosceles triangle, and the two remaining sides of the imaginary isosceles triangle are joined at the apex where the second load applying part 74 is located. Furthermore, the imaginary vertical line, which is perpendicular to the base side of the imaginary isosceles triangle and extends through the central axis of the largest diameter portion 22 of the motor 1, passes the second load applying part 74.

Next, an assembling method of the motor 1 and the damper spring 9 according to the present embodiment will be described with reference to FIGS. 1 to 3.

Before installation of the motor 1 into the motor receiving hole 55 of the motor case 56 of the housing 5, the wave washer 7 is installed into the motor receiving hole 55 toward the closing end 59, which is located at the bottom of the motor receiving hole 55, through the motor installation opening 33 of the motor case 56. Then, the wave washer 7 is fitted into the annular groove 60, which is provided adjacent to the closing end of the motor case 56, so that the wave washer 7 is installed to the bottom of the motor case 56. Thereafter, the motor 1 is installed into the motor receiving hole 55 toward the closing end of the motor receiving hole 55, which is located at the bottom of the motor receiving hole 55, through the motor installation opening 33. At this time, the largest diameter portion 22 of the motor 1 is placed on the first and second ridges 61, 62, which are provided in the cylindrical peripheral wall of the motor case 56, so that the motor 1 is installed into the motor receiving hole 55 of the motor case 56.

Then, the damper spring 9 is installed into the motor receiving hole 55 toward the closing end 59 of the motor receiving hole 55, which is located at the bottom of the motor receiving hole 55, through the spring installation opening 64, which is opened at the location adjacent to the motor installation opening 33 of the motor case 56. At this time, since the second load applying part 74, which is provided at the distal end of the second resilient supporting piece 72 of the damper spring 9, is recurved in the direction opposite from that of the intermediate portion 70, the damper spring 9 is smoothly inserted into the gap between the outer peripheral surface of the largest diameter portion 22 of the motor 1 and the groove wall surface of the axial groove 63 of the cylindrical peripheral wall of the motor case 56. In this way, the damper spring 9 is installed into the gap between the largest diameter portion 22 of the motor 1 and the axial groove 63 of the motor case 56.

Thereafter, the motor fitting hole 32 of the metal plate 31 is fitted around the outer peripheral surface of the first small diameter protrusion 23 of the motor 1. At this time, the two motor power supply contacts 25, which axially project from the front end surface of the largest diameter portion 22 of the motor 1, are inserted through the contact insertion holes 34 of the metal plate 31. Then, the metal plate 31 is fixed to the circumferential edge part of the motor installation opening 33 of the motor case 56 of the housing 5 with the screws 38. Thus, the motor 1 is securely supported in the interior of the motor receiving hole 55 of the motor case 56. At this time, the front end part of the largest diameter portion 22 of the motor 1 is supported through the three-point support at the three circumferential points, i.e., the first load applying part 73 of the damper spring 9 and the first and second ridges 61, 62 of the motor case 56. Furthermore, the rear end part of the largest diameter portion 22 of the motor 1 is also supported through the three-point support at the three circumferential points, i.e., the second load applying part 74 of the damper spring 9 and the first and second ridges 61, 62 of the motor case 56.

The upper end part of the metal plate 31 in FIG. 2 may be further radially outwardly extended to a point, at which the metal plate 31 closes the spring installation opening 64 of the motor case 56, to limit unintentional axial displacement, i.e., unintentional axial removal of the damper spring 9 from the spring installation opening 64. Also, an elongated hole (e.g., an oblong hole) may be formed in the intermediate portion 70 of the damper spring 9 and may be engaged with a projection, which slightly radially inwardly projects from the groove wall surface of the axial groove 63 of the cylindrical peripheral wall of the motor case 56, to limit substantial axial displacement of the damper spring 9 in the axial groove 63 with respect to the largest diameter portion 22 of the motor 1.

Next, operation of the secondary air supply system, particularly the secondary air control valve installed in the secondary air supply system, specifically the flow of the secondary air at the time of valve opening of the secondary air control valve will be described with reference to FIGS. 1 to 3.

The vehicle (e.g., the automobile) has an exhaust gas purification apparatus, such as a three-way catalytic converter, which integrally converts three chemical species, i.e., carbon monoxide (CO), hydrocarbon (HC) and nitrogen oxide (NOx), which are noxious components of exhaust gas outputted from combustion chambers of the engine, into harmless components through chemical reactions. Particularly, in the exhaust gas purification apparatus, the hydrocarbon (HC) is converted into harmless water ($H_2O$) through oxidation. However, in the three-way catalytic converter, the mixture ratio of the air and fuel during the combustion period of the engine needs to be maintained at a theoretical air fuel ratio to maintain the proper chemical reactions. Thus, the mixture ratio of the air and fuel during the combustion period of the engine needs to be kept at the ratio of 15:1, which is the theoretical air fuel ratio. Furthermore, the three-way catalyst does not function properly in the case of the low exhaust gas temperature (i.e., the temperature equal to or less than about 350 degrees Celsius), which is normally encountered right after the engine start.

Thus, when the exhaust gas temperature is relatively low at the time of, for example, the engine start, it is desirable that the electric pump is operated to generate the secondary air in the secondary air pipe, and the secondary air, which is generated through the operation of the electric air pump, is conducted to the three-way catalytic converter through the secondary air pipe, the secondary air control valve and the engine exhaust pipe to promote warming-up of the three-way catalyst to activate the three-way catalyst. Thus, when the exhaust gas temperature is relatively low, for example, right after the engine start (i.e., when the exhaust gas temperature, which is measured with the exhaust temperature sensor, is lower than a predetermined value, or when the temperature of the three-way catalyst, which is measured with a catalyst temperature sensor, is lower than a predetermined temperature), the ECU supplies electric power (the pump drive electric current) to the electric air pump to operate the electric air pump. In this way, the pumping of the secondary air by the electric air pump starts.

Furthermore, the ECU supplies the electric power (the motor drive electric current) to the motor 1 of the secondary air control valve to rotate the motor shaft 21 by the predetermined amount, which is required to open the poppet valve 3. In this way, the poppet valve 3 is opened by the motor torque through the drive force transmission mechanism, which includes the speed reducing gear mechanism and the moving direction converting mechanism (the rack and pinion). Specifically, the motor shaft 21 of the motor 1 is rotated by the predetermined rotational angle, and thereby the pinion gear 35, which is fixed to the motor shaft 21 of the motor 1, is rotated by the predetermined rotational angle about the central axis of the motor shaft 21. Therefore, the motor torque is transmitted to the large diameter gear 41 of the intermediate speed reducing gear 36, which is meshed with the pinion gear 35.

Then, the small diameter gear 42 of the intermediate speed reducing gear 36 is rotated through the rotation of the large diameter gear 41 by a predetermined rotational angle about the central axis of the intermediate speed reducing gear shaft 39, and thereby the motor torque is transmitted to the gear portion 44 of the final gear 37, which is meshed with the small diameter gear 42. At this time, a torsional resilient force, which is exerted to backwardly rotate the final gear 37 toward its original position, is generated (is accumulated) in the coil spring 49. Upon the rotation of the gear portion 44, the pinion gear 45 of the final gear 37 is rotated by a predetermined rotational angle about the central axis of the pinion gear shaft 43. Thus, the valve shaft 12, which has the toothed rack portion 14 meshed with the pinion gear 45, is linearly moved in the axial direction of the valve shaft 12 toward the one side (the side, at which the valve head 11 of the poppet valve 3 opens the valve port 10, i.e., in the downward direction in FIG. 1) by the amount, which corresponds to the rotational angle of the pinion gear 45. In this way, the rear surface side of the valve head 11, which is provided to the one axial end of the valve shaft 12 (the lower end in FIG. 1), is disengaged, i.e., is lifted from the valve seat 4 to open the valve port 10. At this time, the valve head 11 of the poppet valve 3 is lifted on the downstream side of the valve seat 4 in the flow direction of the secondary air. Thus, during the valve opening period of the poppet valve 3, the valve head 11 is held in the valve open state at the position, which is immediately before the check valve.

Thus, the secondary air, which is outputted from the outlet opening of the electric air pump, is supplied from the inlet port 17 into the inlet pipe 16 through the secondary air pipe. The secondary air, which is supplied into the inlet pipe 16, is guided to the valve port 10 from the inlet port 17 through the fluid intake passage 19. Then, the secondary air, which has passed the valve port 10, flows through the space, which is formed between the outer peripheral edge part of the valve head 11 of the poppet valve 3 and the passage wall surface of the communication passage 15 in the interior of the communication passage 15, so that the secondary air is supplied into the fluid pass-through opening of the check valve. Then, the reed valve of the check valve is opened by the pressure of the secondary air, which is supplied into the fluid pass-through opening of the check valve, so that the fluid pass-through opening of the check valve is opened. Therefore, the secondary air, which has passed through the fluid pass-through opening of the check valve, is outputted from the housing of the check valve and is supplied to the three-way catalytic converter through the exhaust pipe of the engine located on the upstream side of the three-way catalytic converter. Thus, at the time of starting the engine, even when the exhaust gas temperature is relatively low, the secondary air, which is generated by operating the electric air pump, is guided to the three-way catalytic converter, so that the oxygen ($O_2$) is combusted to increase the temperature of the three-way catalyst to activate the same. Particularly, due to the oxidation reaction, the hydrocarbon (HC) is changed to the harmless water ($H_2O$), so that the amount of hydrocarbon exhausted into the atmosphere is reduced.

Now, advantages of the first embodiment will be described.

In the motor actuator of the present embodiment, the axial groove 63 is formed in the inner peripheral wall surface of the cylindrical peripheral wall of the motor case 56 of the housing 5 in such a manner that the axial groove 63 is recessed outwardly in the radial direction of the motor 1 from the inner peripheral wall surface of the motor receiving hole 55 of the motor case 56. The spring installation opening 64 is provided to the axial groove 63 to install the damper spring 9 into the interior of the motor case 56. The spring installation opening 64 is opened in the axial direction of the largest diameter portion 22 of the motor 1 toward the outside of the motor case 56 at the location adjacent to the motor installation opening 33 of the motor case 56. In this way, after the installation of the motor 1 into the motor case 56 of the housing 5, the damper spring 9, which reduces the vibration in the radial direction of the motor 1, can be installed from the spring installation opening 64 into the gap between the largest diameter portion 22 of the motor 1 and the axial groove 63 of the motor case 56.

Thus, even after the installation of the damper spring 9 into the interior of the motor case 56, the installation state of the damper spring 9 can be visually checked through the spring installation opening 64. Therefore, the normal installation or abnormal installation of the damper spring 9 can be easily checked. As a result, the damper spring 9 can be positioned in the best circumferential position of the largest diameter portion 22 of the motor 1, i.e., can be positioned in the gap between the largest diameter portion 22 of the motor 1 and the axial groove 63 of the motor case 56. That is, the damper spring 9 can be positioned on the diametrically opposite side of the central axis of the motor 1, which is opposite from the inner peripheral wall surface part (particularly, the first and second ridges 61, 62) of the motor case 56, so that the installability of the damper spring 9 into the interior of the motor case 56 is improved.

Furthermore, in the motor actuator of the present embodiment, the axial groove 63 of the motor case 56 has the generally rectangular space, which extends linearly in the axial direction of the largest diameter portion 22 of the motor 1 from the spring installation opening 64 toward the closing end 59 located at the bottom of the motor receiving hole 55. Also, in the present embodiment, the plate type resilient member (the leaf spring), which extends in the axial direction of the largest diameter portion 22 of the motor 1 is used as the damper spring 9. Furthermore, the lateral profile of the plate type resilient member is configured into the generally W-shape (or the generally inverted V-shape), which is moderately or slightly bent.

Thus, after the installation of the motor 1 into the interior of the motor case 56 of the housing 5, the damper spring 9 can be easily linearly inserted from the spring installation opening 64 into the gap (the gap that includes the above-described rectangular space) between the largest diameter portion 22 of the motor 1 and the axial groove 63 at the best circumferential position of the largest diameter portion 22 of the motor 1, i.e., into the opposite position of the central axis of the motor 1, which is diametrically opposite from the inner peripheral wall surface part (particularly, the first and second ridges 61, 62) of the motor case 56. Therefore, the installability of the damper spring 9 is further improved.

Here, as shown in FIG. 2, the best position for installing the damper spring 9 is the position, at which the front and rear end parts of the largest diameter portion 22 of the motor 1 can be resiliently supported in the radial direction of the motor 1 by the first and second load applying parts 73, 74 of the damper spring 9. Particularly, the best position for installing the damper spring 9 is the position, at which the front and rear end parts of the largest diameter portion 22 of the motor 1, which are equidistantly spaced from the motor center at the opposite ends of the largest diameter portion 22, can be resiliently supported in the radial direction of the motor 1.

Furthermore, the first and second load applying parts 73, 74 are provided at the distal ends (free ends) of the first and second resilient supporting pieces 71, 72 of the damper spring 9 to resiliently contact the front and rear end parts of the largest diameter portion 22 of the motor 1. Each of the first and second load applying parts 73, 74 of the damper spring 9 is positioned to the corresponding position, at which the corresponding one of the front and rear end parts of the largest diameter portion 22 of the motor 1 is supported through the three-point support by the load applying part 73, 74 in corporation with the first and second ridges 61, 62 of the motor case 56. That is, the first load applying part 73 of the damper spring 9 and the first and second ridges 61, 62 of the motor case 56 are arranged at predetermined angular intervals around the front end part of the largest diameter portion 22 of the motor 1, and the second load applying part 74 of the damper spring 9 and the first and second ridges 61, 62 of the motor case 56 are arranged at predetermined angular intervals around the rear end part of the largest diameter portion 22 of the motor 1.

Thus, the spring loads (or the urging forces, resilient repulsive forces) of the first and second load applying parts 73, 74 of the damper spring 9 are used to urge the largest diameter portion 22 of the motor 1 against the first and second ridges 61, 62 of the motor case 56 of the motor 1, so that the vibration in all the radial directions (e.g., the vertical radial direction, the horizontal radial direction and the intermediate radial direction, which is between the vertical radial direction and the horizontal radial direction) of the largest diameter portion 22 of the motor 1 can be effectively reduced.

Here, the first and second load applying parts 73, 74 of the damper spring 9, which is positioned in the gap between the largest diameter portion 22 of the motor 1 and the axial groove 63 of the motor case 56, resiliently support the front and rear end parts of the largest diameter portion 22 of the motor 1 in the radial direction of the motor 1 rather than resiliently supporting the first small diameter protrusion 23 (or the second small diameter protrusion 24) of the motor 1 to reduce the vibration in the radial direction of the motor 1. That is, the front and rear end parts of the largest diameter portion 22 of the motor 1 are resiliently supported in the radial direction of the motor 1 between the first and second load applying parts 73, 74 of the damper spring 9 and the first and second ridges 61, 62 of the motor case 56.

Therefore, the vibration of the front and rear end parts of the largest diameter portion 22 of the motor 1 relative to the motor center part (the axial intermediate part of the largest diameter portion 22) of the motor 1 can be limited. Furthermore, even when the motor shaft 21 is vibrated by the vibration of the motor 1 in the radial direction of the motor 1, the stress is not concentrated in the root of the first small diameter protrusion 23 (or the second small diameter protrusion 24) of the motor 1. Thus, it is possible to limit a damage of the first small diameter protrusion 23 (or the second small diameter protrusion 24) of the motor 1, and thereby it is possible to improve the durability and reliability of the motor 1. As a result, the performance of the motor actuator, particularly the drive force transmission function of the motor actuator can be improved.

Furthermore, in the motor actuator of the present embodiment, the motor shaft 21, which is the gear shaft that forms the rotational center of the pinion gear 35, is spaced by a predetermined gear shaft-to-gear shaft distance from and is arranged parallel to the intermediate speed reducing gear shaft 39, which is the gear shaft that forms the rotational center of the intermediate speed reducing gear 36. Furthermore, the damper spring 9, which is positioned in the gap between the largest diameter portion 22 of the motor 1 and the axial groove 63 of the motor case 56, is positioned at the right angle with respect to the motor axial direction of the pinion gear 35 and also with respect to the gear axial direction of the intermediate speed reducing gear 36. The front and rear end parts of the largest diameter portion 22 of the motor 1 are securely supported by the first and second ridges 61, 62 of the motor case 56. Furthermore, the first small diameter protrusion 23 of the motor 1 is loosely fitted into the motor fitting hole 32 of the metal plate 31 in such a manner that the gap is provided between the small diameter protrusion 23 and the inner peripheral edge of the motor fitting hole 32.

In this way, even when the size variations exist in the outer diameter of the motor 1 due to the component tolerance and product tolerance of the motor 1, the motor shaft 21 of the motor 1 only makes the slight parallel movement in the resiliently deforming direction (the compression direction) of the damper spring 9 with respect to the intermediate speed reducing gear shaft 39. At this time, the positional deviation between the centering position of the first small diameter protrusion 23 at the front end side of the electric moor 1 and the centering position of the second small diameter protrusion 24 at the rear end side of the motor 1 will not occur, and also the central axis of the motor shaft 21 of the motor 1 will not be tilted relative to the normal central axis (e.g., the central axis of the motor case 56).

As a result, even when the size variations occur in the outer diameter of the motor 1 due to the component tolerance and the product tolerance of the motor 1, it is possible to reduce the change in the shaft-to-shaft distance between motor shaft 21 of the motor 1 and the intermediate speed reducing gear shaft 39 of the intermediate speed reducing gear 36, which is meshed with the pinion gear 35 fixed to the motor shaft 21, and also the change in the gear shaft-to-gear shaft distance between the pinion gear 35 and the large diameter gear 41 of the intermediate speed reducing gear 36. That is, it is possible to reduce the influences of the size variations in the outer diameter of the largest diameter portion 22 of the motor 1 on the shaft-to-shaft distance between the motor shaft 21 and the intermediate speed reducing gear shaft 39 and the gear shaft-to-gear shaft distance between the pinion gear 35 and the large diameter gear 41 of the intermediate speed reducing gear 36.

Therefore, the improper engagement between the pinion gear 35 and the large diameter gear 41 of the intermediate speed reducing gear 36 is advantageously limited, so that the motor torque of the motor 1 can be efficiently transmitted from the pinion gear 35 to the large diameter gear 41 (and the intermediate speed reducing gear shaft 39) of the intermediate speed reducing gear 36. As a result, it is possible to limit the reduction in the performance of the motor actuator, particularly the drive force transmission function of the motor actuator.

Second Embodiment

Figure 4A:
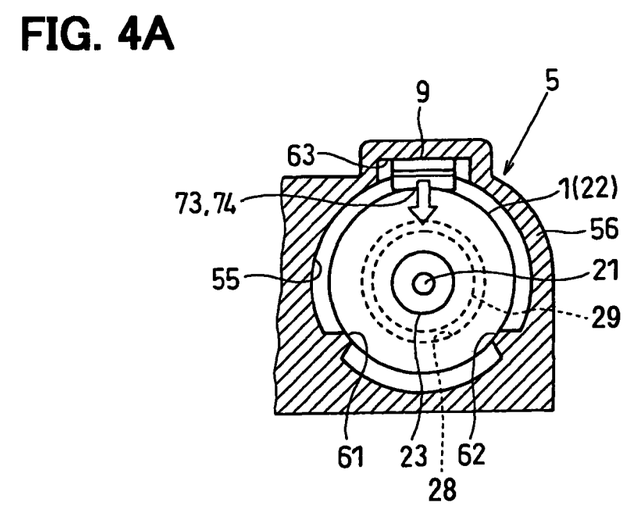
FIGS. 4A and 4B are cross sectional views showing a schematic structure of a motor actuator according to a second embodiment of the present invention.
Figure 4B:
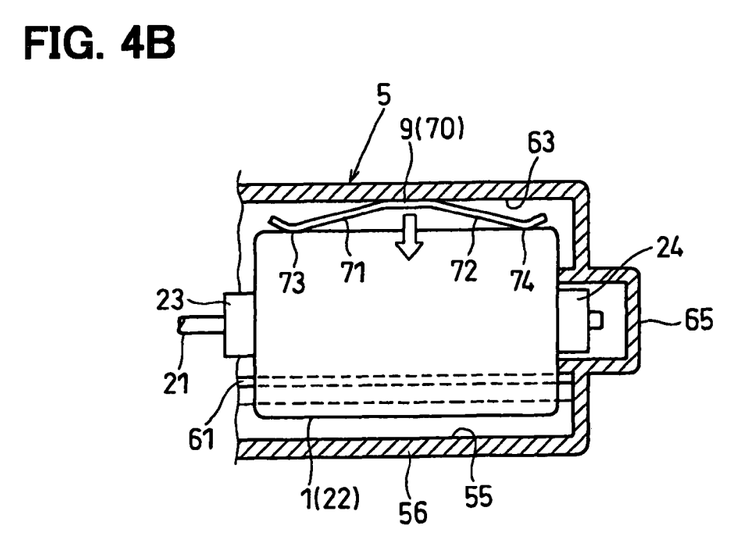

FIGS. 4A and 4B show a second embodiment of the present invention, specifically a schematic structure of a motor actuator according to the second embodiment.

In the present embodiment, the wave washer 7 is eliminated. Furthermore, the damper spring 9 of the present embodiment includes the first resilient supporting piece 71, which is tilted relative to the axial direction of the largest diameter portion 22 of the motor 1 to extend generally linearly from the front end side (the left end side in FIG. 4B) of the intermediate portion 70 of the damper spring 9 toward the outer peripheral surface (or the point adjacent to the spring installation opening 64 of the axial groove 63) of the front end part of the largest diameter portion 22 of the motor 1. Furthermore, the damper spring 9 also includes the second resilient supporting piece 72, which is tilted relative to the axial direction of the largest diameter portion 22 of the motor 1 to extend generally linearly from the rear end side (the right end side in FIG. 4B) of the intermediate portion 70 of the damper spring 9 toward the outer peripheral surface (or the point of the motor receiving hole 55 and of the axial groove 63, which is adjacent to the closing end 59 of the motor case 56) of the rear end part of the largest diameter portion 22 of the motor 1.

Now, modifications of the above embodiments will be described.

In the above embodiments, the present invention is implemented in the motor actuator, which drives the poppet valve 3 of the ASV 2, which is installed in the secondary air supply system provided in the vehicle (e.g., the automobile). However, the present invention is not limited to this. For example, the present invention can be equally implemented in a motor actuator, which drives a valve element (valve) of an intake air flow control valve (e.g., a swirl flow control valve or a tumble flow control valve) or of an intake air quantity control valve (e.g., a throttle valve or an idling rotational speed control valve) or of an exhaust gas reflow quantity control valve (an EGR control valve). In these instances, the check valve may be eliminated.

Furthermore, the present invention may be implemented in a motor actuator, which drives a valve element (valve) of, for example, a fluid passage opening/closing valve, of a fluid passage shutoff valve, of a fluid flow quantity control valve or of a fluid pressure control valve. Furthermore, the present invention may be implemented in a motor actuator, which drives a passage switching door or a opening/closing door of a vehicle air conditioning system, or in a motor actuator, which drives a vehicle door lock. Furthermore, the valve may be a rotary valve, a butterfly valve, a shutter type valve or a ball valve. Also, the valve may be one that is produced by manufacturing the valve element (valve) and the valve shaft separately from each other and thereafter joining the valve element (valve) and the valve shaft together to move integrally.

In the above embodiments, the drive force transmission mechanism (e.g., speed reducing gear mechanism) is provided between the motor shaft 21 of the motor 1 and the valve shaft 12 of the fluid control valve. Alternatively, the drive force transmission mechanism (e.g., the speed reducing gear mechanism) may be eliminated, and the motor shaft 21 of the motor 1 and the valve shaft of the valve may be directly connected to each other. In this instance, only the motor 1 is received in the housing (the actuator case) 5, and the motor shaft 21 of the motor 1 penetrates through the actuator case (having, for example, the motor cover and the motor case 56), so that the rotational output of the motor 1 is outputted from the housing 5. Furthermore, the motor case 56, which receives the motor 1 in the motor receiving hole 55 thereof, may be formed separately from the gear box 54, which receives the drive force transmission mechanism (e.g., the speed reducing gear mechanism) in the gear receiving chamber 53 thereof. Also, the motor case 56, which receives the motor 1 in the motor receiving hole 55 thereof, may be formed separately from the valve body, which receives the poppet valve (valve) 3 in a manner that allows opening and closing of the poppet valve (valve) 3.

In the above embodiments, the first and second projections are provided to project radially inward from the inner peripheral wall surface part (the hole wall surface of the motor receiving hole 55) of the cylindrical peripheral wall of the motor case 56 of the housing 5, and these first and second projections are linearly extended in the axial direction of the largest diameter portion 22 of the motor 1 from the spring installation opening 64 of the axial groove 63 of the motor case 56 toward the closing end, which is provided at the bottom of the motor receiving hole 55. In this way, the first and second ridges 61, 62, each of which has the trapezoidal cross section, are provided in the inner peripheral wall surface part of the cylindrical peripheral wall of the motor case 56. Alternatively, each of the first and second ridges 61, 62 may be formed by arranging two or more projections in a corresponding row in the axial direction of the motor 1. Furthermore, the number of the ridges (or the projections) is not limited to two. For example, three or more ridges (projections) may be arranged at predetermined intervals in the circumferential direction around the largest diameter portion 22 of the motor 1. Further alternatively, the ridge(s) or projection(s) may be formed in an arcuate shape around the largest diameter portion 22 of the motor 1. Further alternatively, the ridges (or the projections) may be eliminated. Also, in the above embodiments, each of the first and second ridges 61, 62 has the trapezoidal cross section. Alternatively, the cross section of each of the first and second ridges (or projections) 61, 62 may be shaped into, for example, a triangular shape, a polygonal shape, which may be a quadrangular shape or a greater polygonal shape, or an arcuate shape, or a semispherical shape (a spherical surface shape).

In the above embodiments, the plate type resilient member (the leaf spring) is used as the damper spring (the resilient motor support element) 9. Alternatively, a resilient element, such as a rubber element or a coil spring, may be used to form the resilient motor support element. Furthermore, two or more resilient motor support elements may be arranged at a constant interval around the largest diameter portion 22 of the motor 1. Furthermore, the resilient motor support element may be formed by the plate type resilient member (the leaf spring), and the lateral profile of the plate type resilient member (the leaf spring) may be configured into a generally B-shape, a generally C-shape, a generally D-shape, a generally J-shape, a generally L-shape, a generally M-shape, a generally O-shape, a generally P-shape, a generally S-shape, a generally V-shape, a generally W-shape, a generally inverted V-shape or the like.

In the above embodiments, the damper spring 9 is provided at the apex of the imaginary isosceles triangle that is formed in the cross section of the motor case 56 such that the straight line, which connects between the first ridge 61 and the second ridge 62, forms the base side of the imaginary isosceles triangle, and the two remaining equal sides of the imaginary isosceles triangle are joined at the apex where the damper spring 9 is located. The base side and each of the two remaining equal sides of the imaginary isosceles triangle may have an equal length. In such a case, the three points, i.e., the damper spring 9 and the first and second ridges 61, 62 are arranged at 120 degree intervals. Alternatively, the length of the base side may differ from the length of each of the two remaining equal sides. That is, when the first and second ridges 61, 62 are spaced from each other by an angular interval, which is in a range of 80 to 160 degrees, each of the first and second ridges 61, 62 is spaced from the damper spring 9 by an angular interval, which is in a range of 100 to 140 degrees.

Additional advantages and modifications will readily occur to those skilled in the art. The invention in its broader terms is therefore not limited to the specific details, representative apparatus, and illustrative examples shown and described.

What is claimed is:

1. A motor actuator comprising:
an electric motor that includes a yoke, which entirely receives a stator core and a rotor core therein, wherein the yoke includes a large diameter portion that extends circumferentially around a motor shaft, which is fixed to the rotor core to rotate integrally therewith, and the yoke rotatably supports the motor shaft through at least one bearing member that is directly held by the yoke; and
a tubular housing that has a closed bottom at one end and extends circumferentially around the large diameter portion of the yoke, wherein:
the housing is made of one of a resin material and a metal material and includes:
a fitting blind hole, into which the large diameter portion of the meter yoke is loosely fitted;
a groove that is radially outwardly recessed from an inner peripheral wall surface of the fitting blind hole; and
first and second projections, which are formed integrally with the inner peripheral wall surface of the fitting blind hole and are circumferentially displaced from the groove, wherein the first and second projections radially inwardly project from the inner peripheral wall surface of the fitting blind hole to support the large diameter portion of the yoke;
a spring having a different resiliency than the first and second projections is positioned in a gap between the large diameter portion of the yoke and the groove of the housing to radially urge the large diameter portion of the yoke against the first and second projections and thereby to resiliently radially support the large diameter portion of the yoke; and
the groove of the housing includes an opening, which is formed at a location adjacent to an opening end of the fitting blind hole, and through which the spring is installed into the gap between the large diameter portion of the yoke and the groove of the housing.

2. The motor actuator according to claim 1, wherein:
the yoke further includes one or two small diameter portions, each of which is provided at a corresponding one of two axial ends of the large diameter portion, has an outer diameter smaller than that of the large diameter portion;
each small diameter portion of the yoke forms a bearing holding part, which holds a corresponding one of the at least one bearing member therein; and
the large diameter portion is located in an axial position, which is different from that of each bearing holding part and forms a largest diameter portion, which has a largest outer diameter in the motor.

3. The motor actuator according to claim 1, wherein the groove of the housing forms a linear space, which extends linearly in an axial direction of the large diameter portion of the yoke from the opening of the groove to a point that is adjacent to a closing end, which closes at a bottom of the fitting blind hole.

4. The motor actuator according to claim 1, wherein the first and second projections radially support and fix the large diameter portion of the yoke.

5. The motor actuator according to claim 1, wherein the groove of the housing is arranged on a diametrically opposite side of a central axis of the motor with respect to the first and second projections.

6. The motor actuator according to claim 1, wherein the spring includes at least one load applying part, which applies a load against the large diameter portion of the yoke to urge the large diameter portion against the first and second projections.

7. The motor actuator according to claim 6, wherein the at least one load applying part is placed at a position, at which the at least one load applying part resiliently contacts the large diameter portion of the yoke.

8. The motor actuator according to claim 6, wherein the at least one load applying part is placed at a position, at which the at least one load applying part provides a three-point support to the large diameter portion of the yoke in cooperation with the first and second projections.

9. The motor actuator according to claim 6, wherein:
the at least one load applying part is provided adjacent to an apex of an imaginary isosceles triangle that is formed in a cross section of the housing such that a straight line, which connects between the first and second projections, forms a base side of the imaginary isosceles triangle, and two remaining sides of the imaginary isosceles triangle are joined at the apex; and
an imaginary vertical line, which is perpendicular to the base side of the imaginary isosceles triangle and extends through a central axis of the motor, passes the at least one load applying part.

10. The motor actuator according to claim 1, wherein:
the yoke further includes one or two small diameter portions, each of which is provided at a corresponding one of two axial ends of the large diameter portion and has an outer diameter smaller than that of the large diameter portion;

the large diameter portion of the yoke includes first and second end parts, which are axially opposed to each other;

the housing includes first and second ridges, which are arranged on a diametrically opposite side of a central axis of the motor with respect to the groove of the housing and extend linearly in an axial direction of the large diameter portion of the yoke; and the spring includes first and second load applying parts, which apply a load against the first and second end parts, respectively, of the large diameter portion of the yoke to urge the first and second end parts of the large diameter portion against the first and second ridges.

11. The motor actuator according to claim 1, further comprising a drive force transmission mechanism, which receives a drive force of the motor to drive a valve, wherein:

the drive force transmission mechanism includes:
  a first gear that is fixed to the motor shaft of the motor; and
  a second gear that is meshed with the first gear to rotate around a gear shaft of the second gear;

the gear shaft of the second gear is spaced from the motor shaft by a predetermined distance and is arranged parallel to the motor shaft; and the spring is arranged on one side of the motor shaft of the first gear and the gear shaft of the second gear in a direction that is generally perpendicular to an axial direction of the motor shaft of the first gear and an axial direction of the gear shaft of the second gear.

12. The motor actuator according to claim 11, wherein the spring is disposed along an imaginary line, which is generally perpendicular to a line that connects between a central axis of the motor shaft of the first gear and a central axis of the gear shaft of the second gear.

13. The motor actuator according to claim 1, wherein the spring is a single resilient motor support element, which resiliently radially supports the large diameter portion of the yoke.

14. The motor actuator according to claim 1, wherein the resiliency of the spring is higher than that of the first and second projections.

15. The motor actuator according to claim 1, wherein:

an outer peripheral surface of the large diameter portion is radially supported by the housing only through the first and second projections and the spring along an entire length of the large diameter portion; and a rest of the outer peripheral surface of the large diameter portion, which is not supported by the first and second projections and the spring, are radially spaced from the housing.

16. The motor actuator according to claim 1, wherein an outer peripheral surface of the large diameter portion is a generally smooth cylindrical surface.

17. The motor actuator according to claim 1, wherein a length of the spring, which is measured in a direction parallel to an axis of the motor shaft, is shorter than a length of the large diameter portion, which is measured in the direction parallel to the axis of the motor shaft.

* * * * *